(12) United States Patent
Dai et al.

(10) Patent No.: US 11,656,445 B2
(45) Date of Patent: May 23, 2023

(54) TELEPHOTO OPTICAL IMAGING SYSTEM AND ZOOM CAMERA APPARATUS

(71) Applicant: Zhejiang Sunny Optics Co., Ltd, Yuyao (CN)

(72) Inventors: Fujian Dai, Yuyao (CN); Kaiyuan Zhang, Yuyao (CN); Liefeng Zhao, Yuyao (CN)

(73) Assignee: Zhejiang Sunny Optics Co., Ltd

( * ) Notice: Subject to any disclaimer, the term of this patent is extended or adjusted under 35 U.S.C. 154(b) by 193 days.

(21) Appl. No.: 17/121,128

(22) Filed: Dec. 14, 2020

(65) Prior Publication Data

US 2021/0199936 A1 Jul. 1, 2021

(30) Foreign Application Priority Data

Dec. 31, 2019 (CN) .......................... 201911416683.8

(51) Int. Cl.
*G02B 17/02* (2006.01)
*G02B 13/02* (2006.01)
*G02B 17/00* (2006.01)
*G02B 15/14* (2006.01)
(Continued)

(52) U.S. Cl.
CPC ....... *G02B 17/004* (2013.01); *G02B 13/0045* (2013.01); *G02B 13/0065* (2013.01); *G02B 15/1421* (2019.08); *G02B 15/1461* (2019.08); *G02B 17/0896* (2013.01)

(58) Field of Classification Search
None
See application file for complete search history.

(56) References Cited

U.S. PATENT DOCUMENTS 4,265,529 A * 5/1981 Yokota .................. G03B 19/12
359/836
4,389,097 A * 6/1983 Ohishi ................ G02B 25/001
359/644

(Continued)

FOREIGN PATENT DOCUMENTS

CN 103748498 A 4/2014
CN 104898353 A 9/2015
(Continued)

OTHER PUBLICATIONS

Chinese Office Action for Application 201911416683.8, dated Jun. 30, 2021, 8 pages.

*Primary Examiner* — Darryl J Collins
(74) *Attorney, Agent, or Firm* — Barnes & Thornburg LLP

(57) ABSTRACT

The present disclosure discloses a telephoto optical imaging system and zoom camera apparatus. The telephoto optical imaging system includes, sequentially from an object side to an image side along an optical axis, a first lens having positive refractive power, a second lens having negative refractive power, an optical path turning prism, and a triangular prism. A total effective focal length F1 of the telephoto optical imaging system may satisfy F1>40 mm. The zoom camera apparatus includes the telephoto optical imaging system and a short-focus optical imaging system arranged in parallel with the telephoto optical imaging system. A total effective focal length F1 of the telephoto optical imaging system and a total effective focal length F2 of the short-focus optical imaging system satisfy F1/F2>5.

19 Claims, 9 Drawing Sheets

(51) Int. Cl.
*G02B 13/00* (2006.01)
*G02B 17/08* (2006.01)

(56) References Cited

U.S. PATENT DOCUMENTS

| | | | | |
|---|---|---|---|---|
| 5,446,590 | A | * 8/1995 | Kikuchi | G02B 25/00 |
| | | | | 396/386 |
| 2002/0149854 | A1 | 10/2002 | Tanaka et al. | |
| 2009/0262434 | A1 | * 10/2009 | Yokoyama | G03B 13/06 |
| | | | | 359/645 |
| 2009/0279182 | A1 | * 11/2009 | Matsuda | G02B 13/16 |
| | | | | 348/340 |
| 2016/0209726 | A1 | * 7/2016 | Kanai | G03B 13/08 |

FOREIGN PATENT DOCUMENTS

| | | |
|---|---|---|
| CN | 205080303 U | 3/2016 |
| JP | H0713076 A | 1/1995 |
| JP | H10104691 A | 4/1998 |
| JP | 2000039649 A | 2/2000 |
| JP | 2001337266 A | 12/2001 |
| JP | 2014106424 A | 6/2014 |
| KR | 20170056255 A | 5/2017 |
| TW | 200301366 A | 7/2003 |

\* cited by examiner

TELEPHOTO OPTICAL IMAGING SYSTEM AND ZOOM CAMERA APPARATUS

CROSS-REFERENCE TO RELATED APPLICATION

This application claims benefit of priority to Chinese Patent Application No. 201911416683.8 filed on Dec. 31, 2019 before the China National Intellectual Property Administration, the entire disclosure of which is incorporated herein by reference in its entity.

TECHNICAL FIELD

The present disclosure relates to the field of optical elements, and more specifically, relates to a telephoto optical imaging system and a zoom camera apparatus.

BACKGROUND

Currently, the requirements for imaging functions of portable electronic devices are becoming higher and higher, and the camera apparatuses of mobile phones are developing in the aspects of high resolution, large field-of-view, light weight and versatility. That requires the optical imaging system in the camera apparatus has multiple characteristics such as large aperture, long focal length, wide field-of-view, compact structure, high image quality and low distortion. On the other hand, since the portable electronic device is expected to have a smaller size, the size of the optical imaging system provided on the electronic device is also limited.

In order to meet these high requirements, on the one hand, the optical imaging system of mobile phone camera apparatuses is becoming more and more complex, from the initial imaging system with four or five lenses to the current imaging system with seven or eight lenses. The increase in the number of lenses in the optical imaging system makes the optimization in the early stage and the manufacturing in the later stage more complicated and difficult. On the other hand, the mobile phone industry tends to employ multiple sets of optical imaging systems for multi-shots. Multiple sets of optical imaging systems highlight different optical characteristics, which usually include a telephoto optical imaging system with a relatively long focal length. Due to the limitation of the thickness of the mobile phone, the optical characteristics of the telephoto optical imaging system are limited, which limits the imaging effects of the mobile phone, such as background blur and object magnification.

Therefore, how to achieve an optical imaging system with good optical characteristics and capable of meeting the requirements of miniaturization is a problem to be solved urgently. In order to meet the requirements of miniaturization and imaging requirements, an optical imaging system that can simultaneously satisfy the characteristics of miniaturization, compact structure, ultra-long focal length and high image quality is required.

SUMMARY

In one aspect, the present disclosure provides a telephoto optical imaging system which includes, sequentially from an object side to an image side along an optical axis, a first lens having positive refractive power, a second lens having negative refractive power, an optical path turning prism, and a triangular prism. An incident surface of the optical path turning prism is perpendicular to an axis of the second lens, and an exit surface of the optical path turning prism is perpendicular to the incident surface of the optical path turning prism. An imaging light incident to the optical path turning prism along the optical axis is reflected sequentially at a first optical path turning surface of the optical path turning prism and a second optical path turning surface of the optical path turning prism and emitted perpendicularly from the exit surface of the optical path turning prism. The light perpendicularly emitted from the exit surface of the optical path turning prism is reflected at a reflecting surface of the triangular prism and deflected by 90° with a deflection direction toward the image side. At least one of an object-side surface of the first lens to an image-side surface of the second lens is aspheric. In one embodiment, a total effective focal length F1 of the telephoto optical imaging system may satisfy F1>40 mm.

In one embodiment, an equivalent distance TL in the air for a path distance of a light traveling along the optical axis from the object-side surface of the first lens to an imaging plane of the telephoto optical imaging system, and a distance T from the object-side surface of the first lens to the imaging plane of the telephoto optical imaging system in a normal direction of the imaging plane of the telephoto optical imaging system may satisfy 3.0<TL/T<4.0.

In one embodiment, a distance T from the object-side surface of the first lens to an imaging plane of the telephoto optical imaging system in a normal direction of the imaging plane of the telephoto optical imaging system and the total effective focal length F1 of the telephoto optical imaging system may satisfy T/F1<0.6.

In one embodiment, the telephoto optical imaging system has a height H in a direction perpendicular to the exit surface of the optical path turning prism, and the height H of the telephoto optical imaging system and a maximum effective diameter D1 of the first lens may satisfy 2.5<H/D1<3.5.

In one embodiment, an angle β between the second optical path turning surface of the optical path turning prism and the incident surface of the optical path turning prism, and an effective diameter h of the incident surface of the optical path turning prism may satisfy 0.2≤|tan β|/h≤0.3.

In one embodiment, an effective diameter h of the incident surface of the optical path turning prism and a maximum effective diameter D2 of the second lens may satisfy 1.0<h/D2<1.5.

In one embodiment, the total effective focal length F1 of the telephoto optical imaging system and an effective focal length f1 of the first lens may satisfy 3.0<F1/f1<4.0.

In one embodiment, the total effective focal length F1 of the telephoto optical imaging system and an effective focal length f2 of the second lens may satisfy −3.5<F1/f2<−3.0.

In one embodiment, an entrance pupil diameter EPD of the telephoto optical imaging system and half of a diagonal length ImgH of an effective pixel area on an imaging plane of the telephoto optical imaging system may satisfy 2.0<EPD/ImgH<3.0.

In one embodiment, a refractive index N1 of the first lens and a refractive index N2 of the second lens may satisfy 1.65<(N1+N2)/2<1.80.

In one embodiment, a spaced interval Tp along the optical axis between the exit surface of the optical path turning prism and the incident surface of the triangular prism may satisfy 2.0<Tp<3.0.

In a second aspect, the present disclosure further provides a telephoto optical imaging system which includes, sequentially from an object side to an image side along an optical axis, a first lens having positive refractive power, a second lens having negative refractive power, an optical path turning prism, and a triangular prism. An incident surface of the optical path turning prism is perpendicular to an axis of the second lens, and an exit surface of the optical path turning prism is perpendicular to the incident surface of the optical path turning prism. An imaging light incident to the optical path turning prism along the optical axis is reflected sequentially at a first optical path turning surface of the optical path turning prism and a second optical path turning surface of the optical path turning prism and emitted perpendicularly from the exit surface of the optical path turning prism. The light perpendicularly emitted from the exit surface of the optical path turning prism is reflected at a reflecting surface of the triangular prism and deflected by 90° with a deflection direction toward. At least one of an object-side surface of the first lens to an image-side surface of the second lens is aspheric. An equivalent distance TL in the air for a path distance of a light traveling along the optical axis from the object-side surface of the first lens to an imaging plane of the telephoto optical imaging system, and a distance T from the object-side surface of the first lens to the imaging plane of the telephoto optical imaging system in a normal direction of the imaging plane of the telephoto optical imaging system satisfy $3.0<TL/T<4.0$.

The present disclosure employs two lenses and two prisms. By setting the prism, the light traveling direction is folded back relative to the arrangement direction of the multiple lenses, so that the size of the optical imaging lens assembly in the light incident direction is reduced. In addition, the use of the optical path turning prism reduces the loss of light energy in the system. At the same time, the above optical imaging system has at least one beneficial effect, such as ultra-long effective focal length, high image quality, small system size, simple structure and compact structure and the like, by rationally configuring the refractive power, the surface shape, the center thickness of each lens, and the on-axis spaced interval between the lenses and the like.

In a third aspect, the present disclosure provides a zoom camera apparatus which includes, the foregoing telephoto optical imaging system; and a short-focus optical imaging system arranged in parallel with the telephoto optical imaging system. A total effective focal length F1 of the telephoto optical imaging system and a total effective focal length F2 of the short-focus optical imaging system may satisfy $F1/F2>5$.

The zoom camera apparatus provided by the present disclosure has a larger zoom range by providing two optical imaging systems, and has at least one beneficial effect, such as ultra-long effective focal length, high image quality, small system size, simple structure and compact structure and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
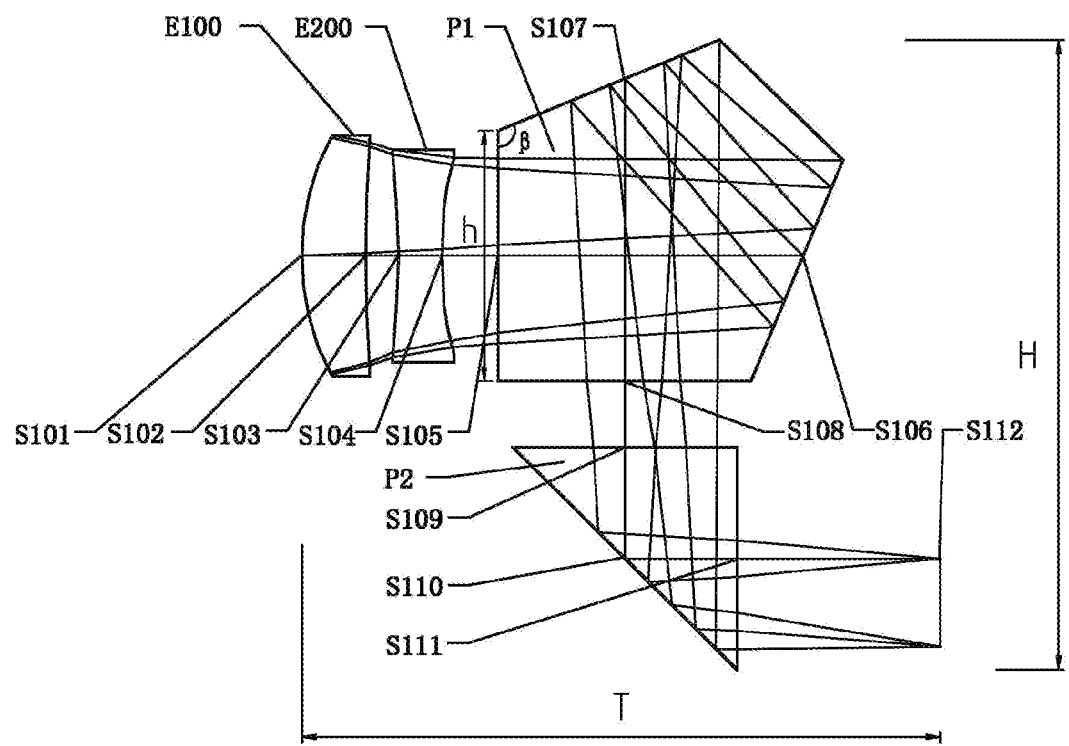
FIG. 1 illustrates a schematic structural view of a telephoto optical imaging system according to the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

Referring to FIG. 1, a telephoto optical imaging system according to an exemplary embodiment of the present disclosure may include a first lens E100, a second lens E200, an optical path turning prism P1, and a triangular prism P2. The two lenses are arranged sequentially from an object side to an image side along an optical axis. There may be an air interval between two adjacent lenses, between two adjacent prisms, and between the lens and the prism. The telephoto optical imaging system may include a stop arranged in an appropriate position. Optionally, the telephoto optical imaging system may further include an optical filter for correcting the color deviation and/or a protective glass for protecting the photosensitive element located on an imaging plane.

In an exemplary embodiment, the first lens E100 has positive refractive power, and the second lens E200 has negative refractive power. The low-order aberrations of the system are effectively compensated by rationally controlling the positive or negative distribution of the refractive power and the surface curvature of each component in the system.

In an exemplary embodiment, the optical path turning prism P1 may at least include an incident surface S105, a first optical path turning surface S106, a second optical path turning surface S107, and an exit surface S108, which are sequentially arranged along the optical axis. The triangular prism P2 may include at least an incident surface S109, a reflecting surface S110, and an exit surface S111. The optical axis turns twice in the optical path turning prism P1, and the optical axis turns once in the triangular prism P2.

The incident surface S105 of the optical path turning prism P1 is perpendicular to an axis of the second lens E200. The exit surface S108 of the optical path turning prism P1 is perpendicular to the incident surface S105 of the optical path turning prism P1. An imaging light incident to the optical path turning prism P1 along the optical axis is reflected sequentially at the first optical path turning surface S106 of the optical path turning prism P1 and the second optical path turning surface S107 of the optical path turning prism P1, and emitted perpendicularly from the exit surface S108 of the optical path turning prism P1. The light perpendicularly emitted from the exit surface S108 of the optical path turning prism P1 is reflected at the reflecting surface S110 of the triangular prism P2 and deflected by 90° with the deflection direction toward the image side. The use of the optical path turning prism P1 reduces the loss of light energy in the telephoto optical imaging system, so that the telephoto optical imaging system has the characteristics of small size and compact structure.

In an exemplary embodiment, the telephoto optical imaging system according to the present disclosure may satisfy: F1>40 mm, where F1 is a total effective focal length of the telephoto optical imaging system. More specifically, F1 may satisfy: F1>45 mm By constraining the total effective focal length of the telephoto optical imaging system, the telephoto optical imaging system has an ultra-long focal length.

In an exemplary embodiment, the telephoto optical imaging system according to the present disclosure may satisfy: 3.0<TL/T<4.0, where TL is an equivalent distance in the air for a path distance of a light traveling along the optical axis from an object-side surface S101 of the first lens E100 to an imaging plane S112 of the telephoto optical imaging system, and T is a distance from the object-side surface S101 of the first lens E100 to the imaging plane S112 of the telephoto optical imaging system in a normal direction of the imaging plane S112 of the telephoto optical imaging system. More specifically, TL and T may satisfy: 3.4<TL/T<3.5. By controlling the ratio of the equivalent distance in the air for the total optical length of the telephoto optical imaging system to the lens structure length, the length of the telephoto optical imaging system may be controlled in the normal direction of the imaging plane S112 (that is, in the horizontal direction during usual use), which may prevent the structural size of the telephoto optical imaging system from being too large. This may better satisfy the market's requirements for small size and compact structure of portable electronic equipment.

In an exemplary embodiment, the telephoto optical imaging system according to the present disclosure may satisfy: T/F1<0.6, where T is a distance from an object-side surface S101 of the first lens E100 to an imaging plane S112 of the telephoto optical imaging system in a normal direction of the imaging plane S112 of the telephoto optical imaging system, and F1 is a total effective focal length of the telephoto optical imaging system. More specifically, T and F1 may satisfy: T/F1<0.5. By constraining the ratio of the structural length of the telephoto optical imaging system to the total effective focal length thereof, it is possible to have an ultra-long effective focal length while ensuring that the telephoto optical imaging system has a smaller size in the horizontal direction as shown in the figure.

In an exemplary embodiment, the optical path turning prism P1 is a pentaprism, and an angle between the first optical path turning surface S106 and the second optical path turning surface S107 is small. By providing a prism surface, the size of the optical path turning prism P1 in the vertical direction may be relatively small.

In an exemplary embodiment, the telephoto optical imaging system according to the present disclosure may satisfy: 2.5<H/D1<3.5, where H is a height in a vertical direction of the telephoto optical imaging system as shown in the figure, and D1 is a maximum effective diameter of the first lens P1. The vertical direction is also the direction of the section of the optical axis between the second optical path turning surface S107 of the optical path turning prism P1 and the reflecting surface S110 of the triangular prism P2. More specifically, H and D1 may satisfy: 2.6<H/D1<3.2. By controlling the ratio of the height of the telephoto optical imaging system in the vertical direction to the maximum effective diameter of the first lens P1, it may effectively ensure that the structural size of the telephoto optical imaging system will not be too large, so that the portable electronic device installed with the telephoto optical imaging system may satisfy the market's requirements for small size and compact structure.

In an exemplary embodiment, the telephoto optical imaging system according to the present disclosure may satisfy: 0.2≤|tan β|/h≤0.3, where β is an angle between the second optical path turning surface S107 of the optical path turning prism P1 and the incident surface S105 of the optical path turning prism P1, and h is an effective diameter of the incident surface S105 of the optical path turning prism P1. The h may be equivalent to the effective height of the incident surface S105 in the vertical direction. More specifically, 13 and h may satisfy: 0.21≤|tan β|/h≤0.28. By matching the angle between the second optical path turning surface S107 and the incident surface S105 with the effective diameter of the incident surface S105, the direction of the imaging light in the optical path turning prism P1 may be restricted, so that the telephoto optical imaging system has a relatively long effective focal length.

In an exemplary embodiment, the telephoto optical imaging system according to the present disclosure may satisfy: 1.0<h/D2<1.5, where h is an effective diameter of the incident surface S105 of the optical path turning prism P1, and D2 is a maximum effective diameter of the second lens E200. More specifically, h and D2 may satisfy: 1.2<h/D2<1.45. By controlling the ratio of the effective diameter of the incident surface S105 to the maximum effective diameter of the second lens E200, it is beneficial to better control the overall size of the telephoto optical imaging system, so that the telephoto optical imaging system satisfies the requirements of structural miniaturization while meeting high-requirement optical performance.

In an exemplary embodiment, the telephoto optical imaging system according to the present disclosure may satisfy: 3.0<F1/f2<4.0, where F1 is a total effective focal length of the telephoto optical imaging system, and f1 is an effective focal length of the first lens E100. More specifically, F1 and f1 may satisfy: 3.48<F1/f1<3.55. By controlling the ratio of the total effective focal length to the effective focal length of the first lens E100, the contribution of the first lens E100 to the total effective focal length may be effectively controlled, and the total effective focal length may be a relatively large value to achieve the characteristics of an ultra-long focal length.

In an exemplary embodiment, the telephoto optical imaging system according to the present disclosure may satisfy: −3.5<F1/f2<−3.0, where F1 is a total effective focal length of the telephoto optical imaging system, and f2 is an effective focal length of the second lens E200. More specifically, F1 and f2 may satisfy: −3.2<F1/f2<−3.15. By controlling the ratio of the total effective focal length to the effective focal length of the second lens E200, the contribution of the second lens E200 to the total effective focal length may be effectively controlled, and the total effective focal length may be a relatively large value to achieve the characteristics of an ultra-long focal length.

In an exemplary embodiment, the telephoto optical imaging system according to the present disclosure may satisfy: 2.0<EPD/ImgH<3.0, where EPD is an entrance pupil diameter of the telephoto optical imaging system, and ImgH is half of a diagonal length of an effective pixel area on an imaging plane S112 of the telephoto optical imaging system. More specifically, EPD and ImgH may satisfy: 2.20<EPD/ImgH<2.70. By controlling the ratio of the entrance pupil diameter to the image height of the telephoto optical imaging system, it is beneficial for the telephoto optical imaging system to achieve large aperture and high image quality, and have a relatively large field-of-view.

In an exemplary embodiment, the telephoto optical imaging system according to the present disclosure may satisfy: 1.65<(N1+N2)/2<1.80, where N1 is a refractive index of the first lens E100, and N2 is a refractive index of the second lens E200. More specifically, N1 and N2 may satisfy: 1.69<(N1+N2)/2<1.73. By reasonably selecting the material of the first lens E100 and the material of the second lens E200, the refractive index of the first lens E100 and the refractive index of the second lens E200 can be controlled. In addition, when the ratio of the two refractive indices satisfies the aforementioned conditional expression, the telephoto optical imaging system has the effects of high image quality and small aberrations.

In an exemplary embodiment, the telephoto optical imaging system according to the present disclosure may satisfy: 2.0<Tp<3.0, where Tp is a spaced interval along the optical axis between the exit surface S108 of the optical path turning prism P1 and the incident surface S109 of the triangular prism P2. More specifically, Tp may satisfy: 2.30<Tp<2.85. By controlling the air interval between the optical path turning prism P1 and the triangular prism P2, a certain moving space is given to the image plane S112, so that the telephoto optical imaging system has better assembly processability, and the telephoto optical imaging system is more compact and more miniaturized.

The optical imaging system according to the above embodiments of the present disclosure may employ a plurality of lenses, such as two lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical performance such as an ultra-long effective focal length.

In the embodiments of the present disclosure, at least one of the surfaces of lenses is aspheric, that is, at least one of the object-side surface S101 of the first lens E100 and the image-side surface S104 of the second lens E200 is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens and the second lens is aspheric. Optionally, the object-side surface and the image-side surface of each of the first lens and the second lens are aspheric.

The present disclosure further provides a zoom camera apparatus which includes, the telephoto optical imaging system according to the foregoing embodiments and the combined embodiments, and a short-focus optical imaging system. The short-focus optical imaging system and the telephoto optical imaging system are arranged in parallel, and both may take images of the same object side. The zoom camera apparatus has compact structure, small size, and good image quality.

In an exemplary embodiment, the zoom camera apparatus according to the present disclosure may satisfy: F1/F2>5, where F1 is a total effective focal length of the telephoto optical imaging system, and F2 is a total effective focal length of the short-focus optical imaging system. More specifically, F1 and F2 may satisfy: F1/F2>7. By reasonably controlling the ratio of the total effective focal length of the two optical imaging systems, the zoom camera apparatus has a good zoom telephoto function.

In an exemplary embodiment, the short-focus optical imaging system may have seven lenses. In an exemplary embodiment, the above short-focus optical imaging system may further include at least a stop. The stop may be disposed at an appropriate position as required, for example, between the lens closest to the object side and the object side. Optionally, the above short-focus optical imaging system may further include an optical filter for correcting the color deviation and/or a protective glass for protecting the photosensitive element located on an imaging plane.

The short-focus optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing. In some embodiments of the present disclosure, at least one of the surfaces of each lens of the short-focus optical imaging system is aspheric. Optionally, the object-side surface and the image-side surface of each lens are aspheric.

However, it will be understood by those skilled in the art that the number of lenses constituting the telephoto optical imaging system and the number of lenses constituting the short-focus optical imaging system may be varied to achieve the various results and advantages described in this specification without departing from the technical solution claimed by the present disclosure. It is also possible to install more optical imaging systems in the zoom camera apparatus.

Some specific examples of optical imaging systems applicable to the above embodiment will be further described below with reference to the accompanying drawings. In the following examples, examples 1 to 3 relate to the telephoto optical imaging system as described above, and examples 4 to 5 relate to the short-focus optical imaging system as described above. The examples provided in the present disclosure have considered the compatibility between each other. In other words, the following telephoto optical imaging system and short-focus optical imaging system of the present disclosure may be arbitrarily combined with each other to achieve a desired zoom camera apparatus.

Example 1

Figure 2:
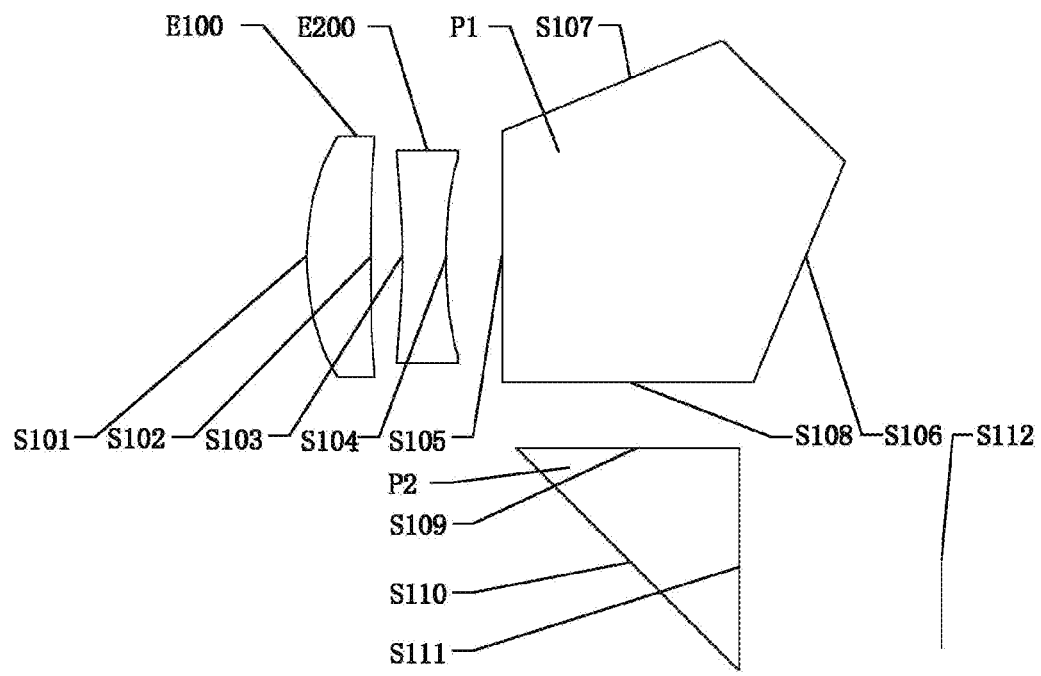
FIG. 2 illustrates a schematic structural view of a telephoto optical imaging system according to example 1 of the present disclosure.

A telephoto optical imaging system according to example 1 of the present disclosure is described below with reference to FIG. 2 to FIG. 3D. FIG. 2 shows a schematic structural view of the telephoto optical imaging system according to example 1 of the present disclosure.

As shown in FIG. 2, the telephoto optical imaging system includes a first lens E100, a second lens E200, an optical path turning prism P1 and a triangular prism P2, which are sequentially arranged from an object side to an image side along an optical axis.

The first lens E100 has positive refractive power, an object-side surface S101 thereof is a convex surface, and an image-side surface S102 thereof is a concave surface. The second lens E200 has negative refractive power, an object-side surface S103 thereof is a concave surface, and an image-side surface S104 thereof is a concave surface. An incident surface S105 of the optical path turning prism P1 to an exit surface S111 of the triangular prism P2 are all spherical surfaces with infinite radius of curvature. Light from an object sequentially passes through the respective surfaces S101 to S111 and is finally imaged on an imaging plane S112 of the telephoto optical imaging system. A stop may be disposed at the object-side surface S101 of the first lens E100.

Table 1 is a table illustrating basic parameters of the telephoto optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S101 | Aspheric | 9.7394 | 2.2900 | 1.743 | 49.34 | 13.58 | 0.9746 |
| S102 | Aspheric | 226.0884 | 1.1466 | | | | 0.0000 |
| S103 | Aspheric | −16.8016 | 1.5634 | 1.689 | 31.08 | −15.00 | −3.4922 |
| S104 | Aspheric | 28.3019 | 2.0000 | | | | 0.0000 |
| S105 | Spherical | Infinite | 10.8640 | 1.517 | 64.17 | | |
| S106 | Spherical | Infinite | −9.0000 | 1.517 | 64.17 | | |
| S107 | Spherical | Infinite | 10.8640 | 1.517 | 64.17 | | |
| S108 | Spherical | Infinite | 2.3654 | | | | |
| S109 | Spherical | Infinite | 4.0000 | 1.517 | 64.17 | | |
| S110 | Spherical | Infinite | −4.0000 | 1.517 | 64.17 | | |
| S111 | Spherical | Infinite | −7.2446 | | | | |
| S112 | Spherical | Infinite | | | | | |

In example 1, a total effective focal length F1 of the telephoto optical imaging system is 47.70 mm, and half of a diagonal length ImgH of an effective pixel area on the imaging plane S112 of the telephoto optical imaging system is 3.17 mm.

In example 1, the object-side surface and the image-side surface of any one of the first lens E100 to the second lens E200 are aspheric. The surface shape $x_1$ of each aspheric lens may be defined by using, but not limited to, the following aspheric formula:

$$x_1 = \frac{c_1 m_1^2}{1 + \sqrt{1 - (k_1 + 1)c_1^2 m_1^2}} + \sum A i m_1^i \quad (1)$$

Where, $x_1$ is the sag—the axis-component of the displacement of the surface from the aspheric vertex, when the surface is at height $m_1$ from the optical axis; $c_1$ is a paraxial curvature of the aspheric surface, $c_1=1/R1$ (that is, the paraxial curvature $c_1$ is reciprocal of the radius of curvature R1 in the above Table 1); $k_1$ is a conic coefficient; Ai is a correction coefficient for the i-th order of the aspheric surface. Table 2 below shows high-order coefficients A4, A6, A8 and A10 applicable to each aspheric surface S101 to S104 in example 1.

TABLE 2

| Surface number | A4 | A6 | A8 | A10 |
|---|---|---|---|---|
| S1 | 5.8243E−05 | −7.5436E−07 | 5.2773E−08 | −2.3047E−09 |
| S2 | 5.2876E−04 | −4.3133E−06 | −5.2751E−07 | 7.8582E−09 |
| S3 | 1.9158E−03 | −8.0799E−05 | 1.0799E−06 | −2.9290E−09 |
| S4 | 1.8337E−03 | −5.2936E−05 | 6.3900E−07 | 2.0478E−08 |

Figure 3A:
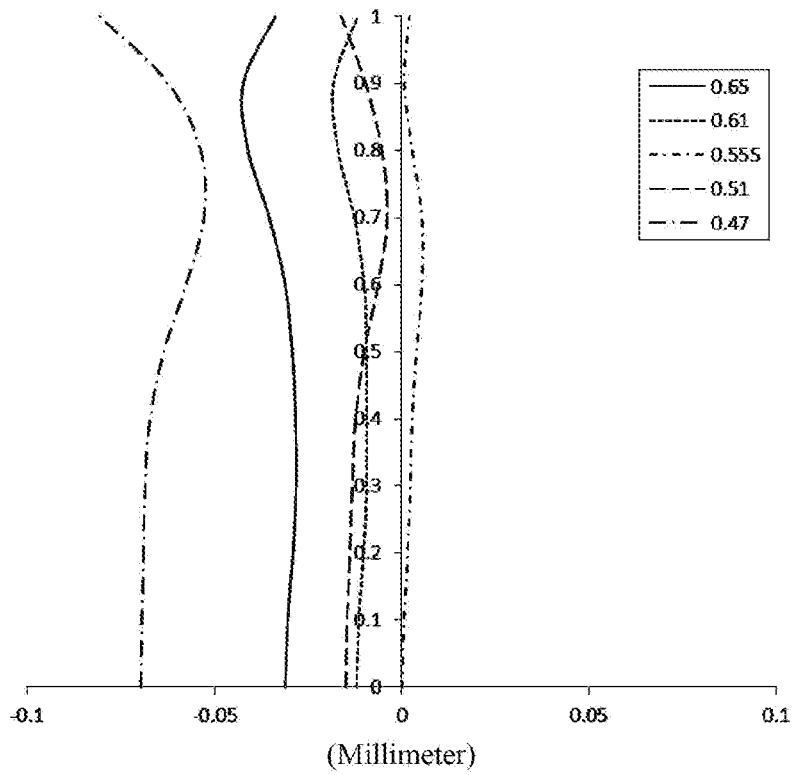
FIGS. 3A to 3D illustrate a longitudinal aberration curve, an astigmatic curve, a distortion curve, and a lateral color curve of the optical imaging system of the example 1, respectively.
Figure 3B:
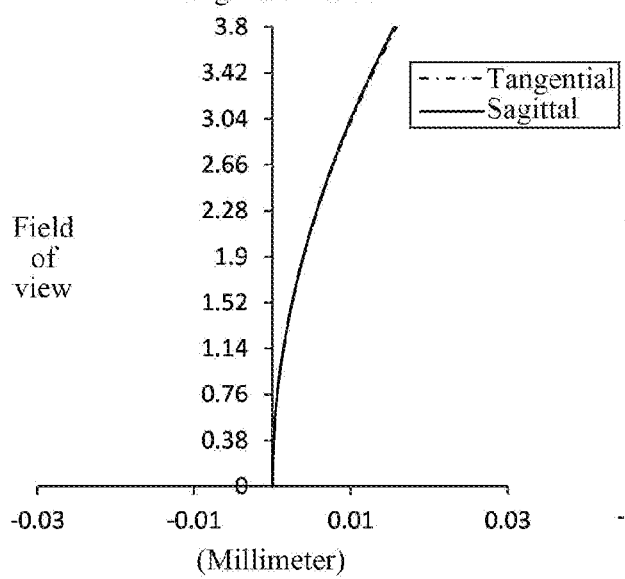
Figure 3C:
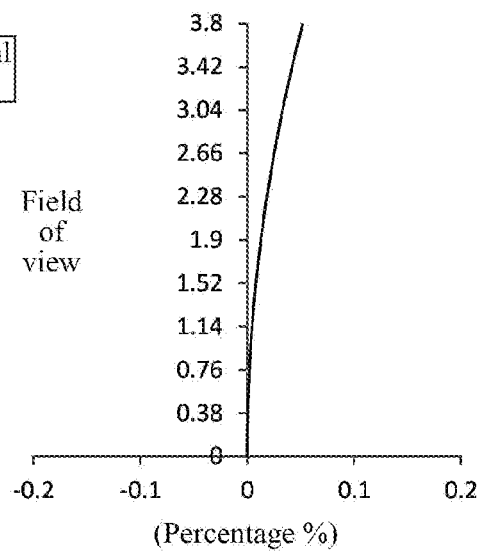
Figure 3D:
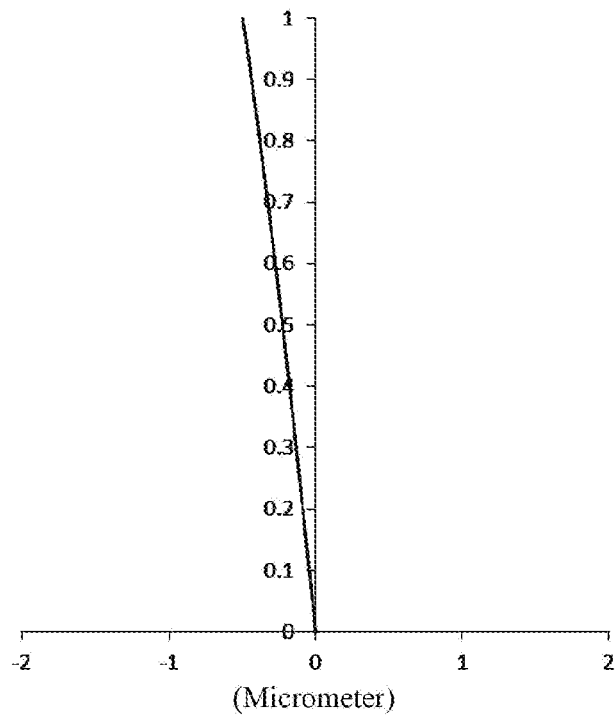

FIG. 3A illustrates a longitudinal aberration curve of the telephoto optical imaging system according to example 1, representing deviations of focal points converged by light of different wavelengths after passing through the system. FIG. 3B illustrates an astigmatic curve of the telephoto optical imaging system according to example 1, representing a curvature of a tangential plane and a curvature of a sagittal plane. FIG. 3C illustrates a distortion curve of the telephoto optical imaging system according to example 1, representing amounts of distortion corresponding to different field-of-views. FIG. 3D illustrates a lateral color curve of the telephoto optical imaging system according to example 1, representing deviations of different image heights on an imaging plane after light passes through the system. It can be seen from FIG. 3A to FIG. 3D that the telephoto optical imaging system provided in example 1 may achieve good image quality.

Example 2

Figure 4:
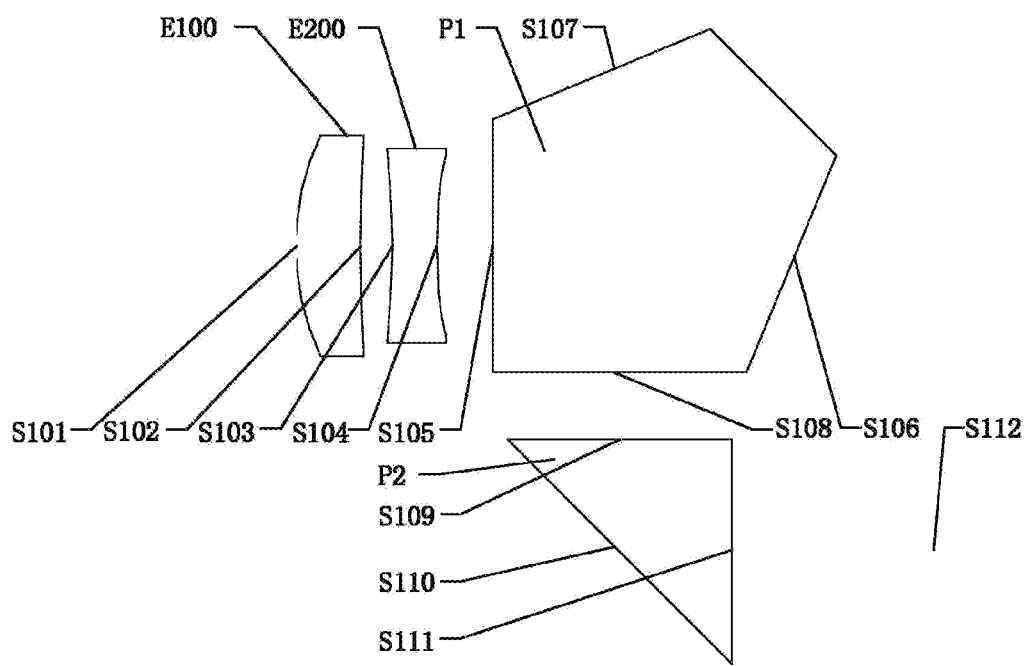
FIG. 4 illustrates a schematic structural view of a telephoto optical imaging system according to example 2 of the present disclosure.

A telephoto optical imaging system according to example 2 of the present disclosure is described below with reference to FIG. 4 to FIG. 5D. In this example and the following examples, for the purpose of brevity, the description of parts similar to those in example 1 will be omitted. FIG. 4 shows a schematic structural view of the telephoto optical imaging system according to example 2 of the present disclosure.

As shown in FIG. 4, the telephoto optical imaging system includes a first lens E100, a second lens E200, an optical path turning prism P1 and a triangular prism P2, which are sequentially arranged from an object side to an image side along an optical axis.

The first lens E100 has positive refractive power, an object-side surface S101 thereof is a convex surface, and an image-side surface S102 thereof is a concave surface. The second lens E200 has negative refractive power, an object-side surface S103 thereof is a concave surface, and an image-side surface S104 thereof is a concave surface. An incident surface S105 of the optical path turning prism P1 to an exit surface S111 of the triangular prism P2 are all spherical surfaces with infinite radius of curvature. Light from an object sequentially passes through the respective surfaces S101 to S111 and is finally imaged on an imaging plane S112 of the telephoto optical imaging system. A stop may be disposed at the object-side surface S101 of the first lens E100.

In example 2, a total effective focal length F1 of the telephoto optical imaging system is 52.47 mm, and half of a diagonal length ImgH of an effective pixel area on the imaging plane S112 of the telephoto optical imaging system is 3.49 mm.

Table 3 is a table illustrating basic parameters of the telephoto optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| S101 | Aspheric | 10.7134 | 2.5190 | 1.743 | 49.34 | 14.94 | 0.9746 |
| S102 | Aspheric | 248.6972 | 1.2613 | | | | 0.0000 |
| S103 | Aspheric | −18.4818 | 1.7197 | 1.689 | 31.08 | −16.50 | −3.4922 |
| S104 | Aspheric | 31.1321 | 2.2000 | | | | 0.0000 |
| S105 | Spherical | Infinite | 11.9504 | 1.517 | 64.17 | | |
| S106 | Spherical | Infinite | −9.9000 | 1.517 | 64.17 | | |
| S107 | Spherical | Infinite | 11.9504 | 1.517 | 64.17 | | |
| S108 | Spherical | Infinite | 2.6020 | | | | |
| S109 | Spherical | Infinite | 4.4000 | 1.517 | 64.17 | | |
| S110 | Spherical | Infinite | −4.4000 | 1.517 | 64.17 | | |
| S111 | Spherical | Infinite | −7.9691 | | | | |
| S112 | Spherical | Infinite | | | | | |

TABLE 4

| Surface number | A4 | A6 | A8 | A10 |
|---|---|---|---|---|
| S1 | 4.3759E−05 | −4.6840E−07 | 2.7081E−08 | −9.7741E−10 |
| S2 | 3.9727E−04 | −2.6782E−06 | −2.7070E−07 | 3.3326E−09 |
| S3 | 1.4394E−03 | −5.0170E−05 | 5.5416E−07 | −1.2422E−09 |
| S4 | 1.3777E−03 | −3.2869E−05 | 3.2791E−07 | 8.6848E−09 |

Figure 5A:
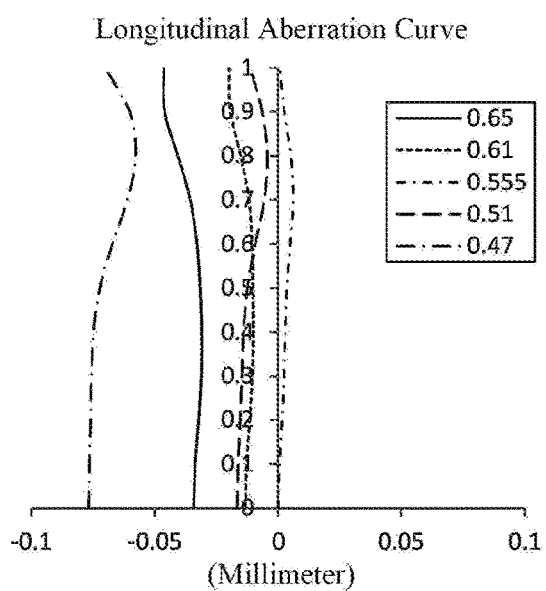
FIGS. 5A to 5D illustrate a longitudinal aberration curve, an astigmatic curve, a distortion curve, and a lateral color curve of the optical imaging system of the example 2, respectively.
Figure 5B:
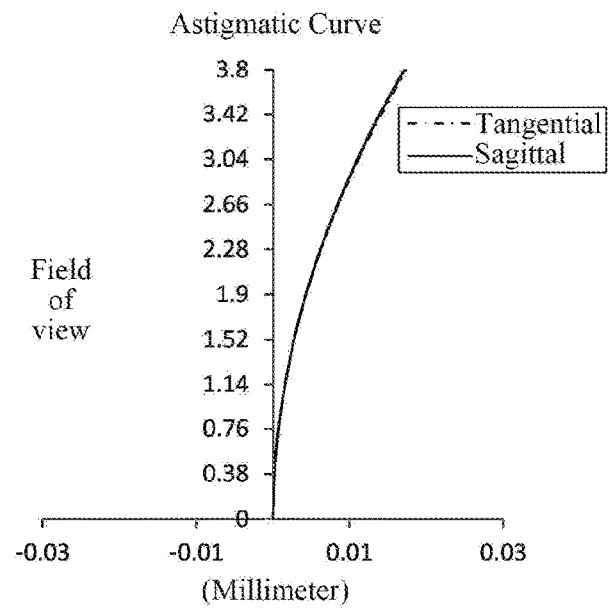
Figure 5C:
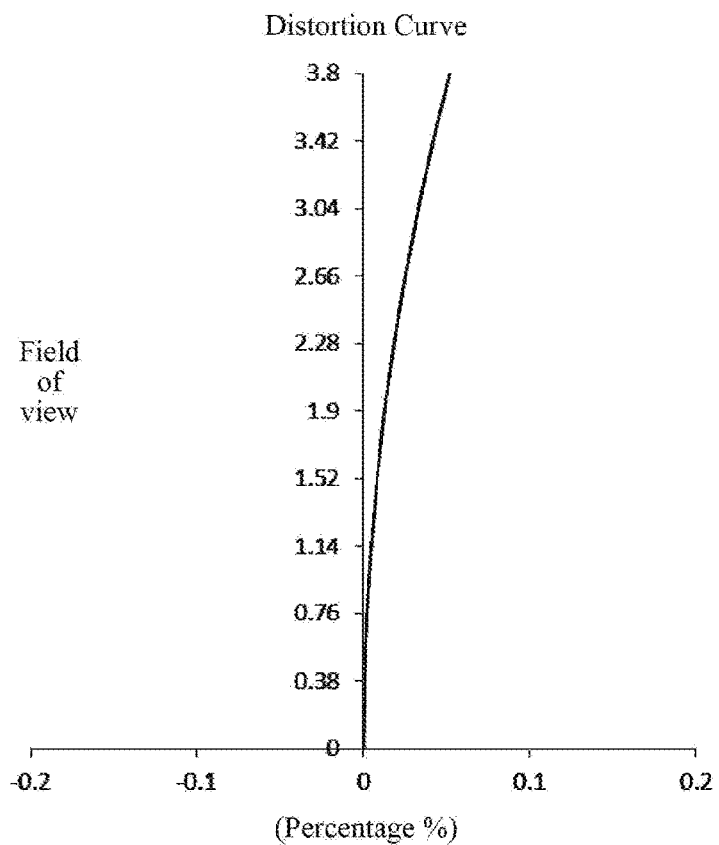
Figure 5D:
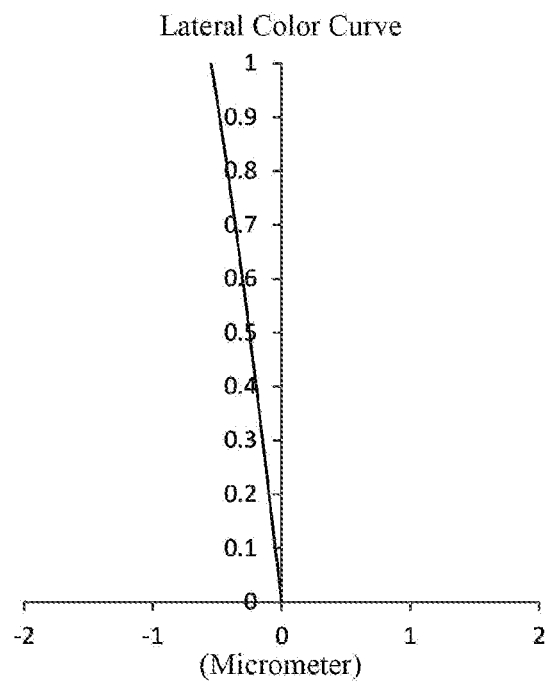

FIG. 5A illustrates a longitudinal aberration curve of the telephoto optical imaging system according to example 2, representing deviations of focal points converged by light of different wavelengths after passing through the system. FIG. 5B illustrates an astigmatic curve of the telephoto optical imaging system according to example 2, representing a curvature of a tangential plane and a curvature of a sagittal plane. FIG. 5C illustrates a distortion curve of the telephoto optical imaging system according to example 2, representing amounts of distortion corresponding to different field-of-views. FIG. 5D illustrates a lateral color curve of the telephoto optical imaging system according to example 2, representing deviations of different image heights on an imaging plane after light passes through the system. It can be seen from FIG. 5A to FIG. 5D that the telephoto optical imaging system provided in example 2 may achieve good image quality.

Example 3

Figure 6:
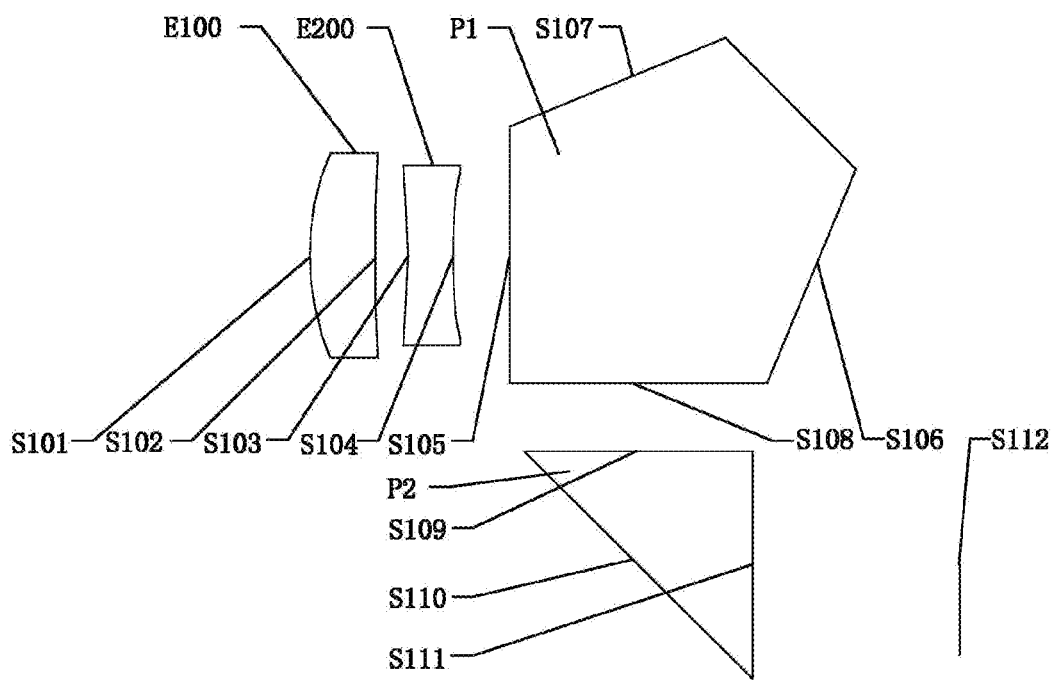
FIG. 6 illustrates a schematic structural view of a telephoto optical imaging system according to example 3 of the present disclosure.

A telephoto optical imaging system according to example 3 of the present disclosure is described below with reference to FIG. 6 to FIG. 7D. FIG. 6 shows a schematic structural view of the telephoto optical imaging system according to example 3 of the present disclosure.

As shown in FIG. 6, the telephoto optical imaging system includes a first lens E100, a second lens E200, an optical path turning prism P1 and a triangular prism P2, which are sequentially arranged from an object side to an image side along an optical axis.

The first lens E100 has positive refractive power, an object-side surface S101 thereof is a convex surface, and an image-side surface S102 thereof is a concave surface. The second lens E200 has negative refractive power, an object-side surface S103 thereof is a concave surface, and an image-side surface S104 thereof is a concave surface. An incident surface S105 of the optical path turning prism P1 to an exit surface S111 of the triangular prism P2 are all spherical surfaces with infinite radius of curvature. Light from an object sequentially passes through the respective surfaces S101 to S111 and is finally imaged on an imaging plane S112 of the telephoto optical imaging system. A stop may be disposed at the object-side surface S101 of the first lens E100.

In example 3, a total effective focal length F1 of the telephoto optical imaging system is 52.47 mm, and half of a diagonal length ImgH of an effective pixel area on the imaging plane S112 of the telephoto optical imaging system is 3.80 mm.

Table 5 is a table illustrating basic parameters of the telephoto optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S101 | Aspheric | 11.6873 | 2.7480 | 1.743 | 49.34 | 16.30 | 0.9746 |
| S102 | Aspheric | 271.3061 | 1.3759 | | | | 0.0000 |
| S103 | Aspheric | −20.1619 | 1.8761 | 1.689 | 31.08 | −18.00 | −3.4922 |
| S104 | Aspheric | 33.9623 | 2.4000 | | | | 0.0000 |
| S105 | Spherical | Infinite | 13.0368 | 1.517 | 64.17 | | |
| S106 | Spherical | Infinite | −10.8000 | 1.517 | 64.17 | | |
| S107 | Spherical | Infinite | 13.0368 | 1.517 | 64.17 | | |
| S108 | Spherical | Infinite | 2.8385 | | | | |
| S109 | Spherical | Infinite | 4.8000 | 1.517 | 64.17 | | |
| S110 | Spherical | Infinite | −4.8000 | 1.517 | 64.17 | | |
| S111 | Spherical | Infinite | −8.6935 | | | | |
| S112 | Spherical | Infinite | | | | | |

TABLE 6

| Surface number | A4 | A6 | A8 | A10 |
|---|---|---|---|---|
| S1 | 3.3706E−05 | −3.0316E−07 | 1.4728E−08 | −4.4666E−10 |
| S2 | 3.0600E−04 | −1.7334E−06 | −1.4722E−07 | 1.5230E−09 |
| S3 | 1.1087E−03 | −3.2471E−05 | 3.0138E−07 | −5.6766E−10 |
| S4 | 1.0612E−03 | −2.1274E−05 | 1.7833E−07 | 3.9688E−09 |

Figure 7A:
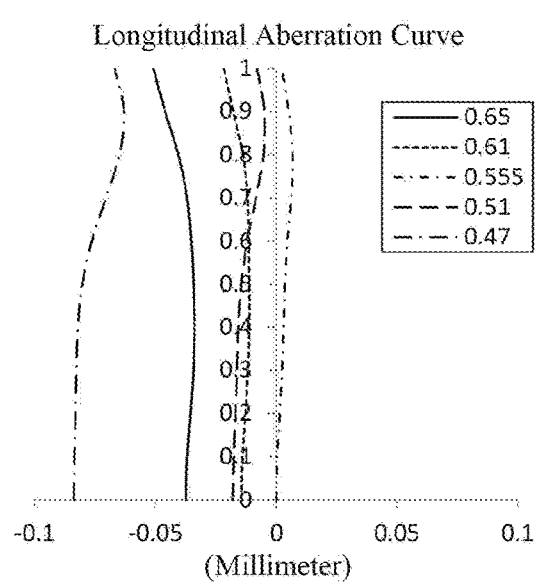
FIGS. 7A to 7D illustrate a longitudinal aberration curve, an astigmatic curve, a distortion curve, and a lateral color curve of the optical imaging system of the example 3, respectively.
Figure 7B:
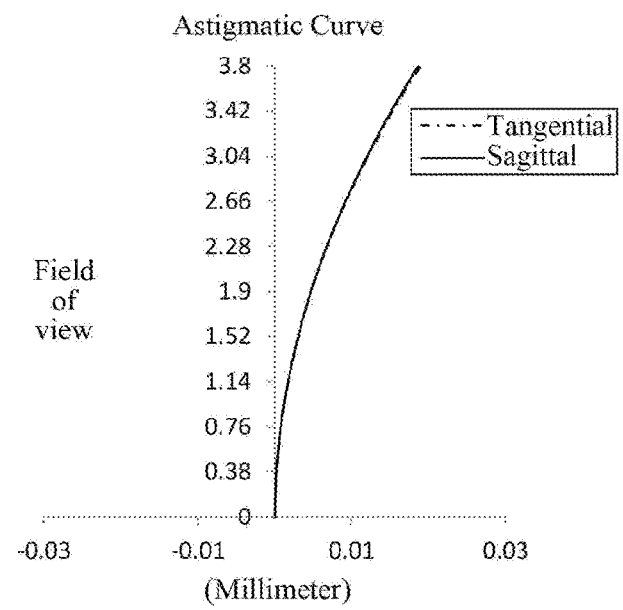
Figure 7C:
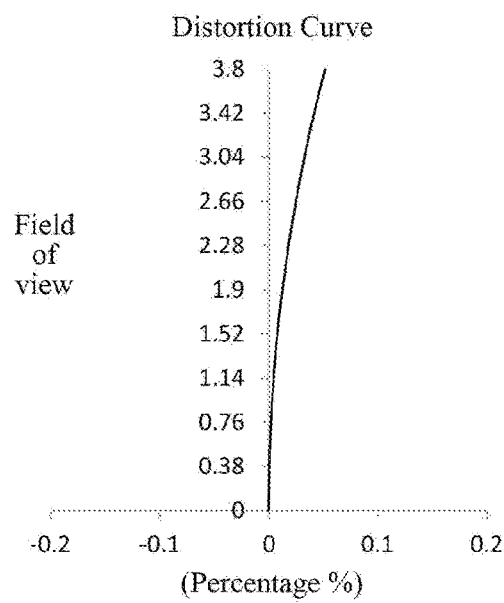
Figure 7D:
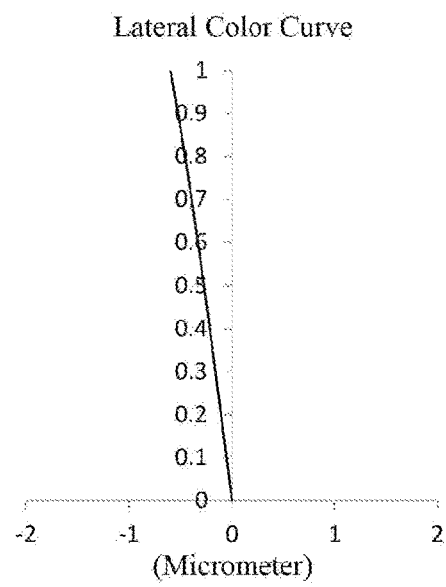

FIG. 7A illustrates a longitudinal aberration curve of the telephoto optical imaging system according to example 3, representing deviations of focal points converged by light of different wavelengths after passing through the system. FIG. 7B illustrates an astigmatic curve of the telephoto optical imaging system according to example 3, representing a curvature of a tangential plane and a curvature of a sagittal plane. FIG. 7C illustrates a distortion curve of the telephoto optical imaging system according to example 3, representing amounts of distortion corresponding to different field-of-views. FIG. 7D illustrates a lateral color curve of the telephoto optical imaging system according to example 3, representing deviations of different image heights on an imaging plane after light passes through the system. It can be seen from FIG. 7A to FIG. 7D that the telephoto optical imaging system provided in example 3 may achieve good image quality.

In view of the above, examples 1 to 3 respectively satisfy the relationship shown in Table 7.

TABLE 7

| Condition/Example | 1 | 2 | 3 |
|---|---|---|---|
| TL/T | 3.44 | 3.44 | 3.44 |
| T/F1 | 0.48 | 0.48 | 0.48 |
| H/D1 | 2.66 | 2.92 | 3.18 |
| \|tanβ\|/h | 0.27 | 0.24 | 0.22 |
| h/D2 | 1.28 | 1.30 | 1.42 |
| f/f1 | 3.51 | 3.51 | 3.51 |
| f/f2 | −3.18 | −3.18 | −3.18 |
| EPD/ImgH | 2.68 | 2.44 | 2.23 |
| (N1 + N2)/2 | 1.72 | 1.72 | 1.72 |
| Tp | 2.37 | 2.60 | 2.84 |

Some specific examples of a zoom camera apparatus applicable to the above embodiment will be further described below with reference to the accompanying drawings.

Example 4

A zoom camera apparatus of this example may include one of the telephoto optical imaging systems in the foregoing embodiments and in examples 1 to 3, and further include a short-focus optical imaging system.

Figure 8:
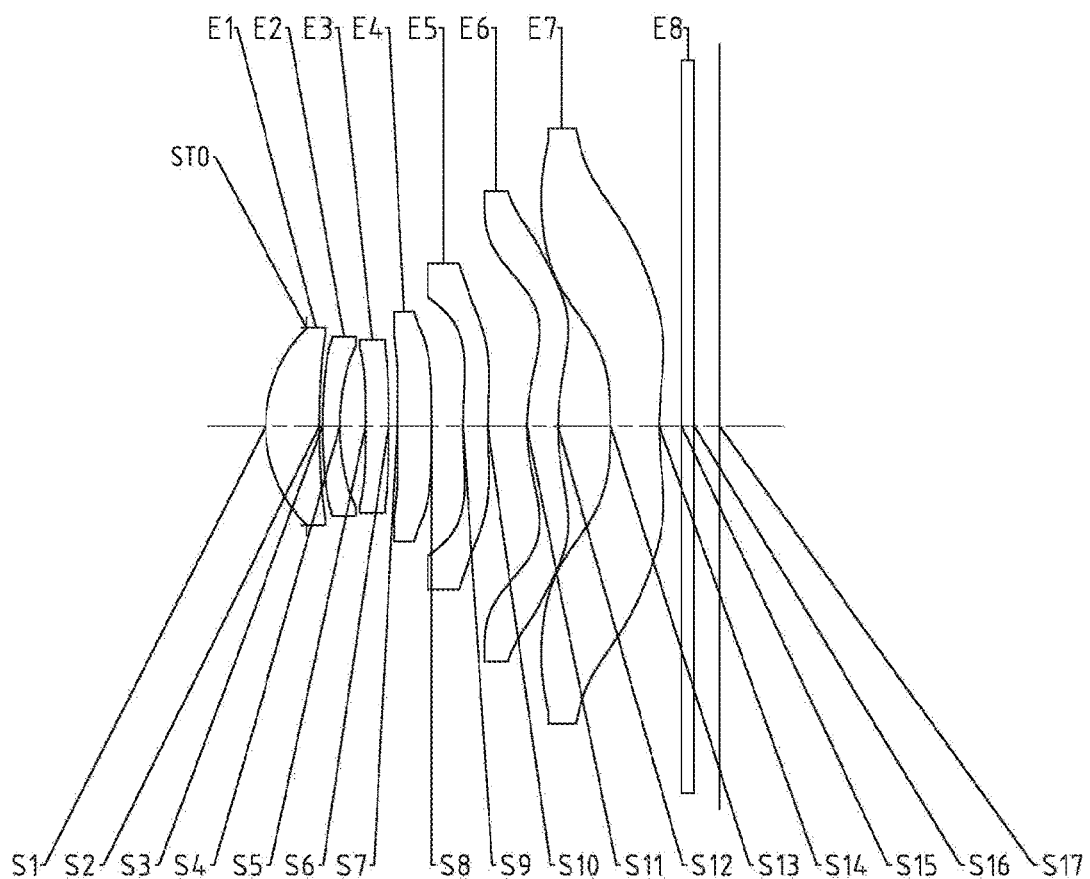
FIG. 8 illustrates a schematic structural view of a short-focus optical imaging system according to example 4 of the present disclosure.

A short-focus optical imaging system according to example 4 of the present disclosure is described below with reference to FIG. 8 to FIG. 9D. FIG. 8 shows a schematic structural view of the short-focus optical imaging system according to example 4 of the present disclosure.

As shown in FIG. 8, the short-focus optical imaging system includes a stop STO, a third lens E1, a fourth lens E2, a fifth lens E3, a sixth lens E4, a seventh lens E5, an eighth lens E6, a ninth lens E7 and an optical filter E8, which are sequentially arranged from an object side to an image side along an optical axis.

The third lens E1 has positive refractive power, an object-side surface S1 thereof is a convex surface, and an image-side surface S2 thereof is a concave surface. The fourth lens E2 has negative refractive power, an object-side surface S3 thereof is a convex surface, and an image-side surface S4 thereof is a concave surface. The fifth lens E3 has negative refractive power, an object-side surface S5 thereof is a concave surface, and an image-side surface S6 thereof is a convex surface. The sixth lens E4 has positive refractive power, an object-side surface S7 thereof is a concave surface, and an image-side surface S8 thereof is a convex surface. The seventh lens E5 has positive refractive power, an object-side surface S9 thereof is a concave surface, and an image-side surface S10 thereof is a convex surface. The eighth lens E6 has positive refractive power, an object-side surface S11 thereof is a concave surface, and an image-side surface S12 thereof is a convex surface. The ninth lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on an imaging plane S17 of the short-focus optical imaging system.

In example 4, a total effective focal length F2 of the short-focus optical imaging system is 6.70 mm, and half of a diagonal length ImgH of an effective pixel area on the imaging plane S17 of the short-focus optical imaging system is 6.40 mm. When the zoom camera apparatus of this example employs the telephoto optical imaging system in example 1, the zoom ratio is 7.12.

Table 8 is a table illustrating basic parameters of the short-focus optical imaging system of example 4, wherein the units for the radius of curvature, the thickness/distance and the focal length are millimeter (mm).

TABLE 8

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.6850 | | | | |
| S1 | Aspheric | 2.3193 | 0.9000 | 1.546 | 56.11 | 5.19 | −0.011 |
| S2 | Aspheric | 13.1178 | 0.0515 | | | | 15.136 |
| S3 | Aspheric | 6.7331 | 0.2901 | 1.678 | 19.25 | −12.40 | 0.000 |
| S4 | Aspheric | 3.5877 | 0.4284 | | | | 0.000 |
| S5 | Aspheric | −9.3507 | 0.3817 | 1.678 | 19.25 | −43.07 | 0.000 |
| S6 | Aspheric | −17.7650 | 0.1461 | | | | 0.000 |
| S7 | Aspheric | −27.7063 | 0.5729 | 1.546 | 56.11 | 32.03 | 0.000 |
| S8 | Aspheric | −6.4090 | 0.5210 | | | | 0.000 |
| S9 | Aspheric | −4.3038 | 0.4100 | 1.570 | 37.31 | 81.14 | 0.000 |
| S10 | Aspheric | −8.0811 | 0.6505 | | | | 0.000 |
| S11 | Aspheric | −9.8694 | 0.5300 | 1.546 | 56.11 | 17.52 | 0.000 |
| S12 | Aspheric | −9.8550 | 0.8759 | | | | 0.805 |
| S13 | Aspheric | −11.7165 | 0.8100 | 1.536 | 55.74 | −6.31 | 0.000 |
| S14 | Aspheric | 5.4470 | 0.3729 | | | | 0.121 |
| S15 | Spherical | Infinite | 0.2100 | 1.517 | 64.20 | | |
| S16 | Spherical | Infinite | 0.4190 | | | | |
| S17 | Spherical | Infinite | | | | | |

In example 4, the object-side surface and the image-side surface of any one of the third lens E1 to the ninth lens E7 are aspheric. The surface shape $x_2$ of each aspheric lens may be defined by using, but not limited to, the following aspheric formula:

$$x_2 = \frac{c_2 m_2^2}{1 + \sqrt{1 - (k_2 + 1)c_2^2 m_2^2}} + \sum Bi m_2^i \quad (2)$$

Where, $x_2$ is the sag—the axis-component of the displacement of the surface from the aspheric vertex, when the surface is at height $m_2$ from the optical axis; $c_2$ is a paraxial curvature of the aspheric surface, $c_2=1/R2$ (that is, the paraxial curvature $c_2$ is reciprocal of the radius of curvature R2 in the above Table 8); $k_2$ is a conic coefficient; Bi is a correction coefficient for the i-th order of the aspheric surface. Table 9 below shows high-order coefficients B4, B6, B8, B10, B12, B14, B16, B18 and B20 applicable to each aspheric surface S1 to S14 in example 4.

Figure 10:
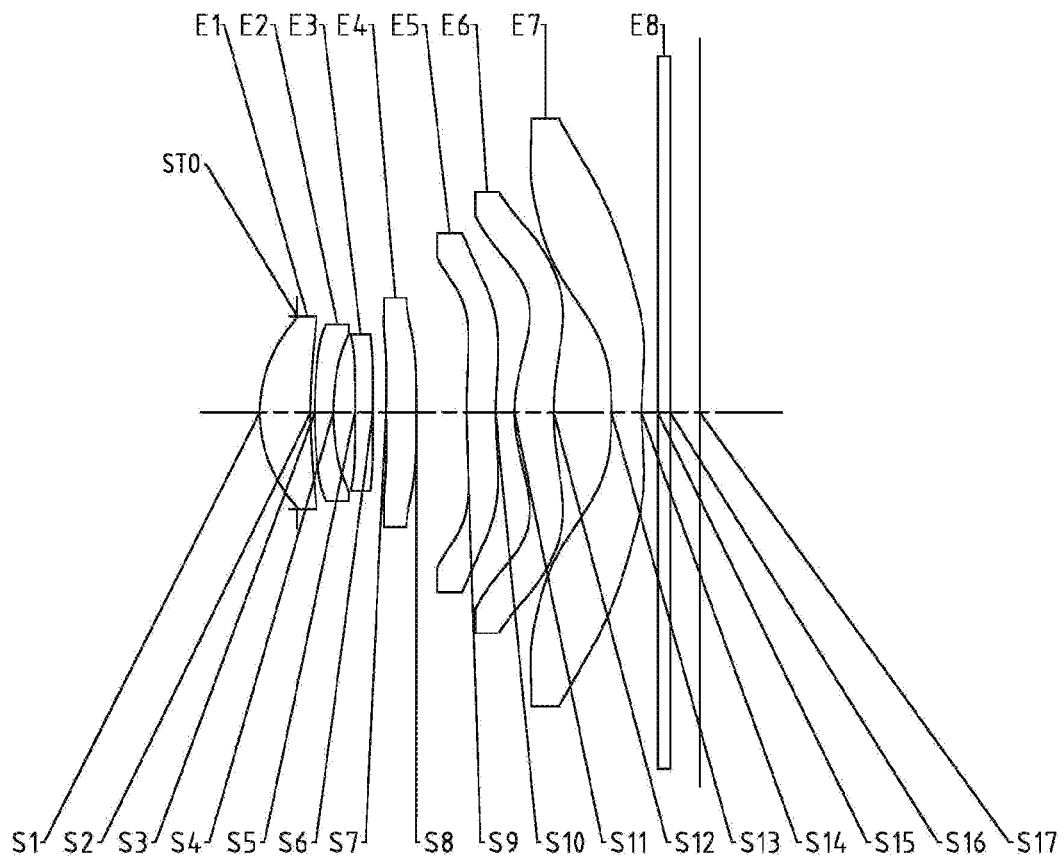
FIG. 10 illustrates a schematic structural view of a short-focus optical imaging system according to example 5 of the present disclosure.

As shown in FIG. 10, the short-focus optical imaging system includes a stop STO, a third lens E1, a fourth lens E2, a fifth lens E3, a sixth lens E4, a seventh lens E5, an eighth lens E6, a ninth lens E7 and an optical filter E8, which are sequentially arranged from an object side to an image side along an optical axis.

TABLE 9

| Surface number | B4 | B6 | B8 | B10 | B12 | B14 | B16 | B18 | B20 |
|---|---|---|---|---|---|---|---|---|---|
| S1 | −8.4271E−03 | −1.6373E−03 | 1.4022E−03 | −5.1051E−04 | 1.5227E−04 | −5.1006E−05 | 2.1046E−05 | −6.6965E−06 | 5.2334E−06 |
| S2 | −2.0807E−02 | 3.5852E−03 | 1.1982E−03 | 1.2762E−03 | 2.6435E−04 | 2.9637E−04 | −5.0860E−05 | 7.3553E−05 | −1.3804E−05 |
| S3 | −9.6169E−02 | 2.1992E−02 | −3.6468E−03 | 2.7382E−03 | −1.4150E−04 | 4.1701E−04 | −1.0682E−04 | 8.3109E−05 | −2.1289E−05 |
| S4 | −5.9474E−02 | 1.1641E−02 | −2.8163E−03 | 1.5481E−03 | −4.5618E−04 | 2.7761E−04 | −1.2172E−04 | 5.8302E−05 | −1.5282E−05 |
| S5 | 6.5631E−02 | 3.7679E−03 | −1.8356E−03 | 5.0585E−04 | −1.1830E−04 | 1.1111E−04 | −6.8334E−05 | 3.1712E−05 | −9.3756E−06 |
| S6 | −2.7204E−02 | 4.3034E−02 | −1.0201E−02 | 1.3290E−03 | 9.4051E−05 | 1.0239E−04 | −7.3964E−05 | 5.0447E−05 | −1.5216E−05 |
| S7 | −6.4914E−02 | 7.4840E−02 | −5.7584E−03 | −6.6374E−03 | 2.7704E−03 | 1.7981E−04 | −2.0616E−04 | 5.3663E−05 | 2.6793E−05 |
| S8 | 1.9111E−02 | 1.4531E−01 | −6.9459E−02 | 1.8346E−02 | 1.2157E−03 | −3.5439E−03 | 2.3029E−03 | −7.7473E−04 | 1.5122E−04 |
| S9 | 7.5932E−01 | 7.8930E−02 | −9.5168E−02 | 6.3922E−02 | −3.0589E−02 | 1.4630E−02 | −4.1668E−03 | 8.0841E−04 | −1.4083E−04 |
| S10 | 2.4891E−02 | 1.4643E−01 | 1.2972E−01 | −2.2891E−02 | −2.1407E−02 | 9.3133E−03 | 8.1198E−03 | −1.7355E−03 | −7.8068E−04 |
| S11 | −4.9777E−01 | 8.5581E−01 | 4.9509E−01 | −1.0423E−01 | −1.5718E−01 | 5.5216E−03 | 6.1221E−02 | 3.5340E−03 | −1.5464E−02 |
| S12 | −9.8457E−03 | 7.4299E−01 | 8.2398E−02 | 1.6289E−01 | −2.3109E−02 | −1.2227E−01 | 3.6826E−02 | 1.5341E−02 | 3.9560E−03 |
| S13 | −1.7940E+00 | −6.6226E−01 | −6.6294E−02 | 1.8543E−01 | 2.8473E−01 | 1.7655E−01 | 2.4170E−02 | −3.5435E−02 | −3.4661E−02 |
| S14 | −5.7893E+00 | 1.0611E+00 | −3.6441E−01 | 7.5989E−02 | −8.0817E−02 | 3.1960E−03 | 9.5569E−03 | −1.2997E−02 | 1.0727E−03 |

Figure 9A:
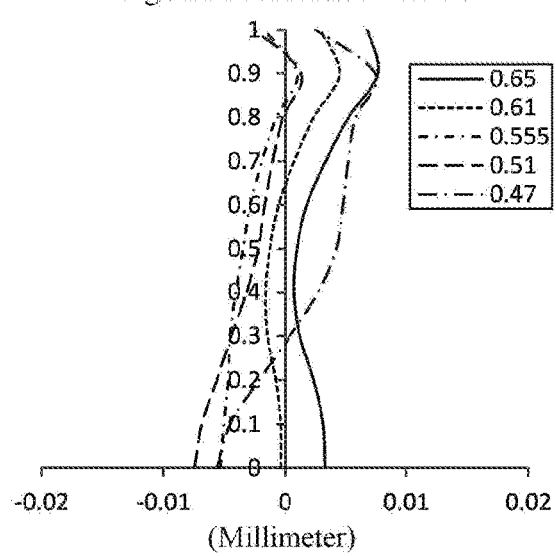
FIGS. 9A to 9D illustrate a longitudinal aberration curve, an astigmatic curve, a distortion curve, and a lateral color curve of the optical imaging system of the example 4, respectively.
Figure 9B:
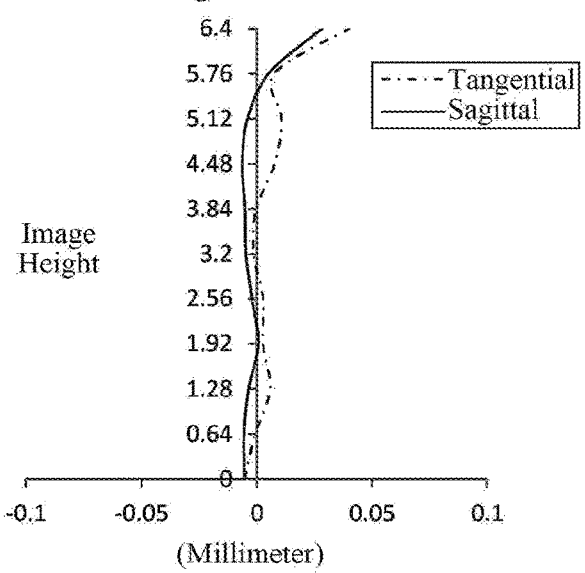
Figures 9C, 9D:
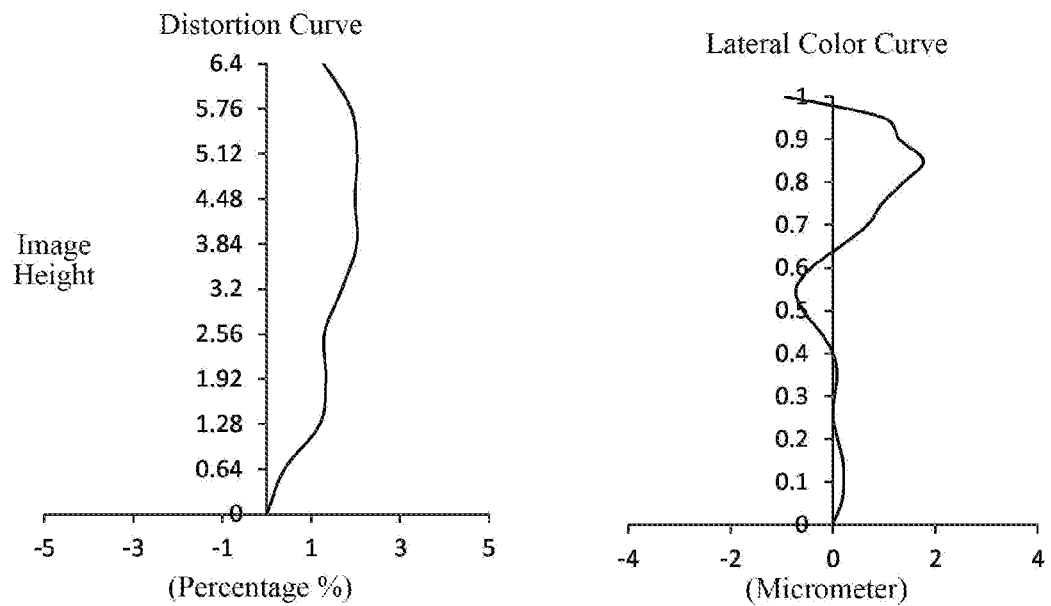

FIG. 9A illustrates a longitudinal aberration curve of the short-focus optical imaging system according to example 4, representing deviations of focal points converged by light of different wavelengths after passing through the system. FIG. 9B illustrates an astigmatic curve of the short-focus optical imaging system according to example 4, representing a curvature of a tangential plane and a curvature of a sagittal plane. FIG. 9C illustrates a distortion curve of the short-focus optical imaging system according to example 4, representing amounts of distortion corresponding to different image heights. FIG. 9D illustrates a lateral color curve of the short-focus optical imaging system according to example 4, representing deviations of different image heights on an imaging plane after light passes through the system. It can be seen from FIG. 9A to FIG. 9D that the short-focus optical imaging system provided in example 4 may achieve good image quality. The zoom camera apparatus has better image quality.

Example 5

A zoom camera apparatus of this example may include one of the telephoto optical imaging systems in the foregoing embodiments and in examples 1 to 3, and further include a short-focus optical imaging system.

A short-focus optical imaging system according to example 5 of the present disclosure is described below with reference to FIG. 10 to FIG. 11D. FIG. 10 shows a schematic structural view of the short-focus optical imaging system according to example 5 of the present disclosure.

The third lens E1 has positive refractive power, an object-side surface S1 thereof is a convex surface, and an image-side surface S2 thereof is a concave surface. The fourth lens E2 has negative refractive power, an object-side surface S3 thereof is a convex surface, and an image-side surface S4 thereof is a concave surface. The fifth lens E3 has negative refractive power, an object-side surface S5 thereof is a concave surface, and an image-side surface S6 thereof is a convex surface. The sixth lens E4 has positive refractive power, an object-side surface S7 thereof is a concave surface, and an image-side surface S8 thereof is a convex surface. The seventh lens E5 has negative refractive power, an object-side surface S9 thereof is a concave surface, and an image-side surface S10 thereof is a convex surface. The eighth lens E6 has positive refractive power, an object-side surface S11 thereof is a concave surface, and an image-side surface S12 thereof is a convex surface. The ninth lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on an imaging plane S17 of the short-focus optical imaging system.

In example 5, a total effective focal length F2 of the short-focus optical imaging system is 6.63 mm, and half of a diagonal length ImgH of an effective pixel area on the imaging plane S17 of the short-focus optical imaging system is 6.40 mm. When the zoom camera apparatus of this example employs the telephoto optical imaging system in example 3, the zoom ratio is 8.63.

Table 10 is a table illustrating basic parameters of the short-focus optical imaging system of example 5, wherein the units for the radius of curvature, the thickness/distance and the focal length are millimeter (mm). Table 11 shows high-order coefficients applicable to each aspheric surface in example 5, wherein the surface shape of each aspheric surface may be defined by the formula (2) given in the above example 4.

Figure 11A:
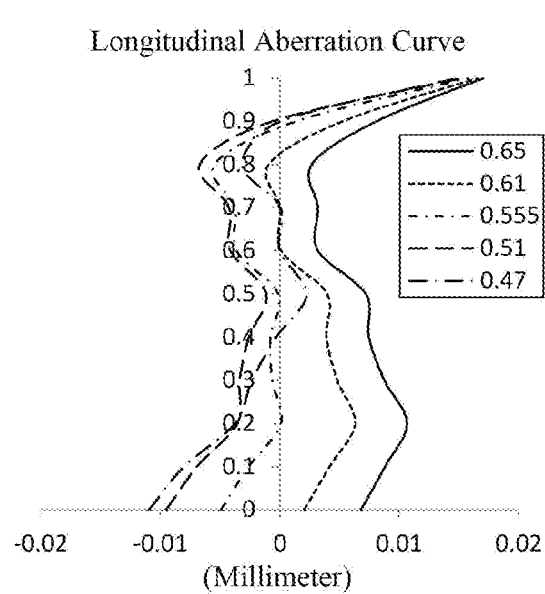
FIGS. 11A to 11D illustrate a longitudinal aberration curve, an astigmatic curve, a distortion curve, and a lateral color curve of the optical imaging system of the example 5, respectively.
Figure 11B:
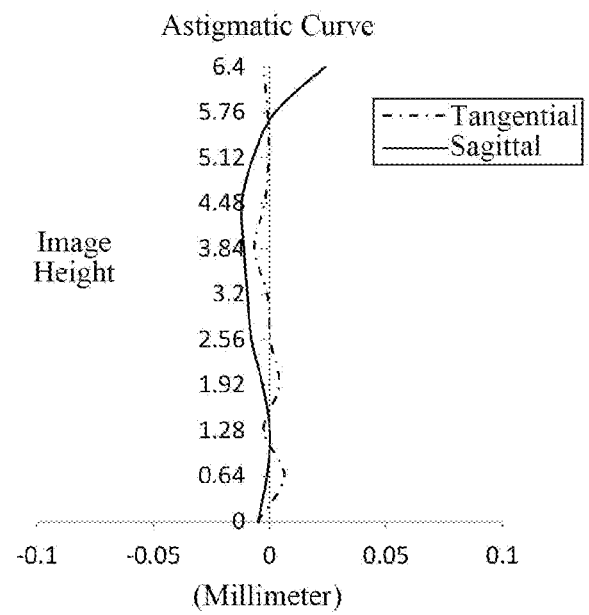
Figure 11C:
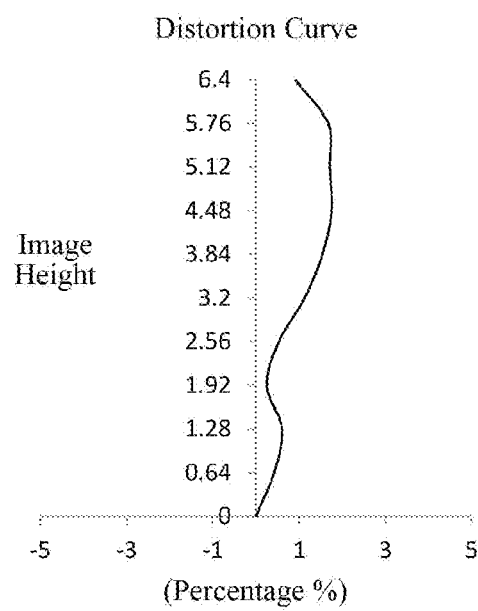
Figure 11D:
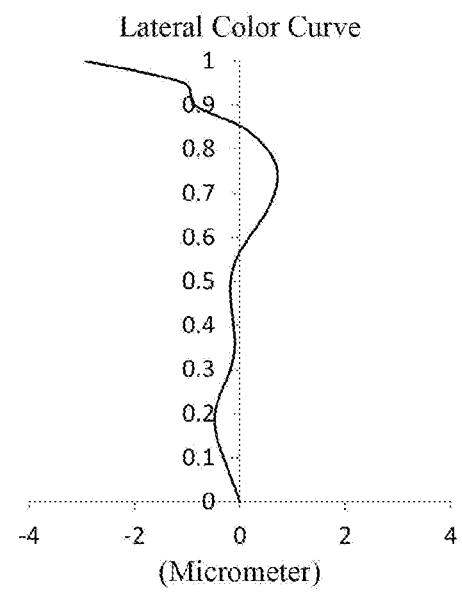

FIG. 11A illustrates a longitudinal aberration curve of the short-focus optical imaging system according to example 5, representing deviations of focal points converged by light of different wavelengths after passing through the system. FIG. 11B illustrates an astigmatic curve of the short-focus optical imaging system according to example 5, representing a curvature of a tangential plane and a curvature of a sagittal plane. FIG. 11C illustrates a distortion curve of the short-

TABLE 10

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6375 | | | | |
| S1 | Aspheric | 2.3975 | 0.8682 | 1.546 | 56.11 | 5.45 | 0.000 |
| S2 | Aspheric | 12.4601 | 0.0742 | | | | 0.000 |
| S3 | Aspheric | 6.1900 | 0.3162 | 1.678 | 19.25 | −12.25 | 0.000 |
| S4 | Aspheric | 3.4819 | 0.3681 | | | | 0.000 |
| S5 | Aspheric | −12.0814 | 0.3072 | 1.678 | 19.25 | −151.80 | 0.000 |
| S6 | Aspheric | −24.0308 | 0.2227 | | | | 0.000 |
| S7 | Aspheric | −43.2121 | 0.5193 | 1.546 | 56.11 | 33.70 | 0.000 |
| S8 | Aspheric | −11.4032 | 0.8577 | | | | 0.000 |
| S9 | Aspheric | −7.2989 | 0.5000 | 1.570 | 37.31 | −24.21 | 0.000 |
| S10 | Aspheric | −8.5684 | 0.3215 | | | | 0.000 |
| S11 | Aspheric | −8.7152 | 0.6745 | 1.546 | 56.11 | 8.26 | 0.000 |
| S12 | Aspheric | −8.0404 | 0.9877 | | | | 0.000 |
| S13 | Aspheric | −8.7596 | 0.5100 | 1.536 | 55.74 | −5.69 | 0.000 |
| S14 | Aspheric | −9.6724 | 0.2805 | | | | 0.000 |
| S15 | Spherical | Infinite | 0.2142 | 1.517 | 64.20 | | |
| S16 | Spherical | Infinite | 0.5061 | | | | |
| S17 | Spherical | Infinite | | | | | |

TABLE 11

| Surface number | B4 | B6 | B8 | B10 | B12 | B14 | B16 | B18 | B20 |
|---|---|---|---|---|---|---|---|---|---|
| S1 | 5.6361E−02 | −2.5411E−02 | 1.0980E−02 | −4.0092E−03 | 1.4335E−03 | −4.6916E−04 | 1.3796E−04 | −3.8318E−05 | 1.5599E−05 |
| S2 | 3.5558E−02 | −1.4845E−02 | 8.5170E−03 | 6.8749E−04 | −2.1106E−03 | 2.2775E−03 | −1.3842E−03 | 6.7742E−04 | −1.9075E−04 |
| S3 | −1.3648E−01 | 2.7687E−02 | −2.4111E−03 | 1.7501E−03 | −9.3695E−04 | 1.1322E−03 | −6.2394E−04 | 2.7954E−04 | −6.9536E−05 |
| S4 | −6.2308E−02 | 8.4439E−04 | 6.8300E−03 | −5.1738E−03 | 3.3458E−03 | −1.5471E−03 | 6.0732E−04 | −1.6555E−04 | 2.1288E−05 |
| S5 | 1.0734E−01 | −9.0074E−03 | 4.9558E−03 | −4.1453E−03 | 2.7900E−03 | −1.3479E−03 | 5.5902E−04 | −1.8693E−04 | 4.0548E−05 |
| S6 | 1.6760E−02 | 1.9690E−02 | −5.0720E−03 | 8.0396E−04 | 1.1187E−04 | −8.6118E−06 | −1.0049E−05 | 8.0415E−06 | 2.0557E−06 |
| S7 | −6.5241E−02 | 5.4548E−02 | 8.4862E−03 | −7.7361E−03 | 5.2207E−04 | 1.1776E−03 | −2.0857E−04 | −1.7429E−04 | 9.2362E−05 |
| S8 | −9.4224E−02 | 9.4117E−02 | 1.8981E−03 | −1.3769E−02 | 5.0277E−03 | 2.0003E−04 | −6.7281E−04 | 2.3613E−04 | −1.1619E−05 |
| S9 | 3.5438E−01 | 2.9640E−01 | −1.0309E−01 | −3.3219E−02 | 4.1182E−02 | −8.8540E−03 | −7.6102E−05 | 1.0094E−03 | −1.4277E−04 |
| S10 | 2.1149E−01 | 2.0937E−01 | 1.5325E−01 | −6.3021E−02 | 8.5556E−03 | 1.8973E−02 | 8.6358E−03 | −6.2928E−03 | 1.4695E−03 |
| S11 | 6.1356E−01 | 7.0924E−01 | 2.1251E−01 | −1.8725E−01 | 3.0854E−02 | 2.7427E−02 | −1.1693E−03 | −1.6920E−02 | 6.5317E−03 |
| S12 | 3.9446E−01 | 7.6954E−01 | −7.1193E−02 | 6.5055E−02 | −7.5268E−03 | −6.0853E−02 | 2.2553E−02 | −1.5976E−02 | −5.9630E−04 |
| S13 | −1.6888E+00 | −5.4395E−01 | −2.8075E−02 | 1.0801E−01 | 2.2405E−01 | 1.3204E−01 | 1.0985E−02 | −3.4605E−03 | −1.9508E−03 |
| S14 | 1.2715E−01 | 9.7808E−02 | 1.8733E−01 | −1.9956E−02 | 2.3852E−01 | 4.9957E−02 | 3.3977E−02 | 6.6821E−02 | −3.2301E−02 | focus optical imaging system according to example 5, representing amounts of distortion corresponding to different image heights. FIG. 11D illustrates a lateral color curve of the short-focus optical imaging system according to example 5, representing deviations of different image heights on an imaging plane after light passes through the system. It can be seen from FIG. 11A to FIG. 11D that the short-focus optical imaging system provided in example 5 may achieve good image quality. The zoom camera apparatus has better image quality.

The present disclosure further provides a zoom camera apparatus, which is provided with an electronic photosensitive element for imaging. The electronic photosensitive element may be a photosensitive Charge-Coupled Device (CCD) or a Complementary Metal-Oxide Semiconductor (CMOS). The zoom camera apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A telephoto optical imaging system, sequentially from an object side to an image side of the telephoto optical imaging system along an optical axis, comprising:
   a first lens having positive refractive power;
   a second lens having negative refractive power;
   an optical path turning prism, wherein an incident surface of the optical path turning prism is perpendicular to an axis of the second lens, an exit surface of the optical path turning prism is perpendicular to the incident surface of the optical path turning prism, and wherein an imaging light incident to the optical path turning prism along the optical axis is reflected sequentially at a first optical path turning surface of the optical path turning prism and a second optical path turning surface of the optical path turning prism and emitted perpendicularly from the exit surface of the optical path turning prism; and
   a triangular prism, wherein the light perpendicularly emitted from the exit surface of the optical path turning prism is reflected at a reflecting surface of the triangular prism and deflected by 90° with a deflection direction toward the image side;
   wherein F1>40 mm, where F1 is a total effective focal length of the telephoto optical imaging system:
   wherein 2.0<EPD/ImgH<3.0,
   where EPD is an entrance pupil diameter of the telephoto optical imagining system, and ImgH is half of a diagonal length of an effective pixel area on imaging plane of the telephoto optical imaging system.

2. The telephoto optical imaging system according to claim 1, wherein 3.0<TL/T<4.0,
   where TL is an equivalent distance in the air for a path distance of the light traveling along the optical axis from the object-side surface of the first lens to an imaging plane of the telephoto optical imaging system, and T is a distance from the object-side surface of the first lens to the imaging plane of the telephoto optical imaging system in a normal direction of the imaging plane of the telephoto optical imaging system.

3. The telephoto optical imaging system according to claim 1, wherein T/F1<0.6,
   where T is a distance from the object-side surface of the first lens to an imaging plane of the telephoto optical imaging system in a normal direction of the imaging plane of the telephoto optical imaging system, and F1 is the total effective focal length of the telephoto optical imaging system.

4. The telephoto optical imaging system according to claim 1, wherein the telephoto optical imaging system has a height H in a direction perpendicular to the exit surface of the optical path turning prism, and
   wherein 2.5<H/D1<3.5, where H is the height of the telephoto optical imaging system, and D1 is a maximum effective diameter of the first lens.

5. The telephoto optical imaging system according to claim 1, wherein $0.2 \le |\tan \beta|/h \le 0.3$,
   where $\beta$ is an angle between the second optical path turning surface of the optical path turning prism and the incident surface of the optical path turning prism, and h is an effective diameter of the incident surface of the optical path turning prism.

6. The telephoto optical imaging system according to claim 1, wherein 1.0<h/D2<1.5,
   where h is an effective diameter of the incident surface of the optical path turning prism, and D2 is a maximum effective diameter of the second lens.

7. The telephoto optical imaging system according to claim 1, wherein 3.0<F1/f1<4.0,
   where F1 is the total effective focal length of the telephoto optical imaging system, and f1 is an effective focal length of the first lens.

8. The telephoto optical imaging system according to claim 1, wherein −3.5<F1/f2<−3.0,
   where F1 is the total effective focal length of the telephoto optical imaging system, and f2 is an effective focal length of the second lens.

9. The telephoto optical imaging system according to claim 1, wherein 1.65<(N1+N2)/2<1.80,
   where N1 is a refractive index of the first lens, and N2 is a refractive index of the second lens.

10. The telephoto optical imaging system according to claim 1, wherein 2.0<Tp<3.0,
    where Tp is a spaced interval along the optical axis between the exit surface of the optical path turning prism and the incident surface of the triangular prism.

11. A zoom camera apparatus, comprising:
    the telephoto optical imaging system according to claim 1; and
    a short-focus optical imaging system, arranged in parallel with the telephoto optical imaging system,
    wherein F1/F2>5,
    where F1 is a total effective focal length of the telephoto optical imaging system, and F2 is a total effective focal length of the short-focus optical imaging system.

12. A telephoto optical imaging system, sequentially from an object side to an image side of the telephoto optical imaging system along an optical axis, comprising:
    a first lens having positive refractive power;
    a second lens having negative refractive power;
    an optical path turning prism, wherein an incident surface of the optical path turning prism is perpendicular to an axis of the second lens, an exit surface of the optical path turning prism is perpendicular to the incident surface of the optical path turning prism, and wherein an imaging light incident to the optical path turning prism along the optical axis is reflected sequentially at a first optical path turning surface of the optical path turning prism and a second optical path turning surface of the optical path turning prism and emitted perpendicularly from the exit surface of the optical path turning prism; and a triangular prism, wherein the light perpendicularly emitted from the exit surface of the optical path turning prism is reflected at a reflecting surface of the triangular prism and deflected by 90° with a deflection direction toward the image side;

wherein $3.0<TL/T<4.0$, where TL is an equivalent distance in the air for a path distance of the light traveling along the optical axis from the object-side surface of the first lens to an imaging plane of the telephoto optical imaging system, and T is a distance from the object-side surface of the first lens to the imaging plane of the telephoto optical imaging system in a normal direction of the imaging plane of the telephoto optical imaging system.

13. The telephoto optical imaging system according to claim 12, wherein $T/F1<0.6$, where T is a distance from the object-side surface of the first lens to an imaging plane of the telephoto optical imaging system in a normal direction of the imaging plane of the telephoto optical imaging system, and F1 is the total effective focal length of the telephoto optical imaging system.

14. The telephoto optical imaging system according to claim 12, wherein the telephoto optical imaging system has a height H in a direction perpendicular to the exit surface of the optical path turning prism, and wherein $2.5<H/D1<3.5$, where H is the height of the telephoto optical imaging system, and D1 is a maximum effective diameter of the first lens.

15. The telephoto optical imaging system according to claim 12, wherein $0.2 \le |\tan \beta|/h \le 0.3$, where $\beta$ is an angle between the second optical path turning surface of the optical path turning prism and the incident surface of the optical path turning prism, and h is an effective diameter of the incident surface of the optical path turning prism.

16. The telephoto optical imaging system according to claim 12, wherein $1.0<h/D2<1.5$, where h is an effective diameter of the incident surface of the optical path turning prism, and D2 is a maximum effective diameter of the second lens.

17. The telephoto optical imaging system according to claim 12, wherein $3.0<F1/f1<4.0$, where F1 is a total effective focal length of the telephoto optical imaging system, and f1 is an effective focal length of the first lens.

18. The telephoto optical imaging system according to claim 12, wherein $-3.5<F1/f2<-3.0$, where F1 is a total effective focal length of the telephoto optical imaging system, and f2 is an effective focal length of the second lens.

19. The telephoto optical imaging system according to claim 12, wherein $2.0<EPD/ImgH<3.0$, where EPD is an entrance pupil diameter of the telephoto optical imaging system, and ImgH is half of a diagonal length of an effective pixel area on the imaging plane of the telephoto optical imaging system.

* * * * *